US008639898B2

(12) United States Patent
Ueda

(10) Patent No.: US 8,639,898 B2
(45) Date of Patent: Jan. 28, 2014

(54) STORAGE APPARATUS AND DATA COPY METHOD

(75) Inventor: Akihiro Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 912 days.

(21) Appl. No.: 12/779,427

(22) Filed: May 13, 2010

(65) Prior Publication Data

US 2010/0299491 A1    Nov. 25, 2010

(30) Foreign Application Priority Data

May 20, 2009    (JP) ................................ 2009-121602

(51) Int. Cl.
*G06F 12/00* (2006.01)
(52) U.S. Cl.
USPC ..... 711/162; 711/203; 711/170; 711/E12.001
(58) Field of Classification Search
USPC ........... 711/162, 170, 114, E12.001, 203, 202
See application file for complete search history.

(56) References Cited

U.S. PATENT DOCUMENTS

| 6,883,073 | B2 * | 4/2005 | Arakawa et al. .............. 711/162 |
| 7,024,586 | B2 | 4/2006 | Kleiman et al. | |
| 7,415,593 | B2 * | 8/2008 | Mashima et al. ............. 711/203 |
| 8,370,564 | B2 * | 2/2013 | Haneda et al. ................ 711/103 |
| 2003/0237019 | A1 | 12/2003 | Kleiman et al. | |
| 2004/0039890 | A1 | 2/2004 | Itoh et al. | |
| 2004/0088505 | A1 | 5/2004 | Watanabe | |
| 2007/0214194 | A1 | 9/2007 | Reuter | |
| 2007/0277011 | A1 * | 11/2007 | Tanaka et al. ................ 711/162 |
| 2008/0120459 | A1 | 5/2008 | Kaneda et al. | |
| 2008/0177809 | A1 | 7/2008 | Murayama et al. | |

FOREIGN PATENT DOCUMENTS

| JP | 2-093721 A | 4/1990 |
| JP | 2003-256148 A | 9/2003 |
| JP | 2005-531071 A | 10/2005 |
| JP | 2007-242020 A | 9/2007 |
| JP | 2008-130080 A | 6/2008 |
| JP | 2008-181271 A | 8/2008 |

OTHER PUBLICATIONS

"Japanese Office Action" mailed by JPO and corresponding to Japanese application No. 2009121602 on Apr. 19, 2011, with English translation.
Extended European Search Report dated Jul. 21, 2011 for corresponding European Application No. 10162571.3.

* cited by examiner

*Primary Examiner* — Pierre-Michel Bataille
(74) *Attorney, Agent, or Firm* — Fujitsu Patent Center

(57) ABSTRACT

A storage apparatus connectable to another storage apparatus so as to copy the data thereto, for providing a first virtual volume including at least a first block, includes at least a storage unit having storage areas, each storage area being allocatable as a one of the first blocks; a memory storing information for indicating a relationship between each first block and each the storage area, at least one of the storage areas being allocated to the at least one of the first blocks according to a usage pattern of the first virtual volume; and a controller configured to receive an instruction for copying data, determine whether each first block is allocated to any of the storage areas or not in reference to the information, transmit data indicating that one of the first blocks is unallocated to any of the first storage areas on the basis of the determination.

16 Claims, 12 Drawing Sheets

FIG. 4

| COPY SOURCE | COPY DESTINATION | PROCESSING |
|---|---|---|
| ThinPro VOLUME TO WHICH PHYSICAL AREA IS NOT ALLOCATED | ThinPro VOLUME TO WHICH PHYSICAL AREA IS NOT ALLOCATED | UN-ALLOCATED → COMPRESSED DATA → UN-ALLOCATED → UN-ALLOCATED, SKIP COPYING |
| | ThinPro VOLUME TO WHICH PHYSICAL AREA IS ALLOCATED | UN-ALLOCATED → COMPRESSED DATA → ALLOCATED → UN-ALLOCATED, SKIP COPYING |
| | CURRENT VOLUME | UN-ALLOCATED → COMPRESSED DATA → (filled) → (filled), WRITE ZERO DATA |
| ThinPro VOLUME TO WHICH PHYSICAL AREA IS ALLOCATED | ThinPro VOLUME TO WHICH PHYSICAL AREA IS NOT ALLOCATED | ALLOCATED → REAL DATA → UN-ALLOCATED → ALLOCATED, COPY REAL DATA |
| | ThinPro VOLUME TO WHICH PHYSICAL AREA IS ALLOCATED | ALLOCATED → REAL DATA → ALLOCATED → ALLOCATED, COPY REAL DATA |
| | CURRENT VOLUME | ALLOCATED → REAL DATA → (filled) → (filled), COPY REAL DATA |
| CURRENT VOLUME | ThinPro VOLUME TO WHICH PHYSICAL AREA IS NOT ALLOCATED | (filled) → REAL DATA → UN-ALLOCATED → ALLOCATED, COPY REAL DATA |
| | ThinPro VOLUME TO WHICH PHYSICAL AREA IS ALLOCATED | (filled) → REAL DATA → ALLOCATED → ALLOCATED, COPY REAL DATA |
| | CURRENT VOLUME | (filled) → REAL DATA → (filled) → (filled), COPY REAL DATA |

FIG. 9

| IDENTIFICATION NUMBER | COPY TYPE | COPY SIZE [BC] | COPY SOURCE | | | COPY DESTINATION | | |
|---|---|---|---|---|---|---|---|---|
| | | | Vol. TYPE | LUN_V | START LBA | Vol. TYPE | LUN_V | START LBA |
| 0 | REMOTE/EC *1 | 0x200000 | ThinPro Vol | 0x02 | 0x1000 | ThinPro Vol | 0x05 | 0x1000 |
| 1 | REMOTE/EC | 0x400000 | NORMAL Vol | 0x03 | 0x2000 | ThinPro Vol | 0x06 | 0x2000 |
| 2 | LOCAL/OPC *2 | 0x400000 | ThinPro Vol | 0x04 | 0x3000 | NORMAL Vol | 0x10 | 0x4000 |
| · | · | · | · | · | · | · | · | · |
| · | · | · | · | · | · | · | · | · |
| · | · | · | · | · | · | · | · | · |

*1 EC stands for Equivalent Copy that is a mirror suspend copy function.
*2 OPC stands for One Point Copy that is a background copy function.

FIG. 12

| IDENTIFICATION NUMBER | VIRTUAL VOLUME INFORMATION | | PHYSICAL VOLUME INFORMATION | |
|---|---|---|---|---|
| | LUN_V | LBA | LUN_V | LBA |
| 0 | 0x02 | 0x20000 | 0x20 | 0x50000 |
| 1 | 0x02 | 0x30000 | 0x21 | 0x10000 |
| 2 | 0x04 | 0x10000 | 0x20 | 0x60000 |
| . | . | . | . | . |
| . | . | . | . | . |
| . | . | . | . | . |

FIG. 13

| TRANSFER LENGTH [BC] | COPY DESTINATION LUN_V | COPY DESTINATION START LBA |
|---|---|---|
| 0x200 | 0x05 | 0x10000 |
| 0x10000 | 0x06 | 0x2100 |
| . | . | . |
| . | . | . |
| . | . | . |

STORAGE APPARATUS AND DATA COPY METHOD

CROSS-REFERENCE TO RELATED APPLICATIONS

This application is based upon and claims the benefit of priority of the prior Japanese Patent Application No. 2009-121602, filed on May 20, 2009, the entire contents of which are incorporated herein by reference.

FIELD

The embodiments discussed herein are related to a storage apparatus and a data copy method.

BACKGROUND

With the increase in a storage capacity of a storage apparatus, a technique for virtually allocating a physical resource such as a disk has received attention in recent years. In Thin Provisioning, the demanded amount of storage use is provided as a virtual volume by preparing only a physical disk capacity corresponding to the actual amount of storage use without preparing a physical disk capacity corresponding to the demanded amount of storage use. When the actual amount of storage use approaches a prepared physical disk capacity, only an additional physical disk capacity is added and operation is continuously performed. Thus, a Thin Provisioning volume is a variable allocation virtual volume to which a physical area (storage area) is variably allocated in accordance with a usage pattern. With such a Thin Provisioning volume, it is possible to establish a virtual volume having a capacity larger than the prepared physical disk capacity.

With the current progress of computerization, more data for the business continuity of a company or the like is stored in a storage apparatus. In this case, it is preferable to periodically back up data stored in a storage apparatus. Various backup mechanisms for effectively backing up data stored in a storage apparatus have been researched and developed. As one of these backup mechanisms, an advanced copy function of rapidly performing backup only with a storage apparatus without using the Central Processing Unit (CPU) of a server is known. Such an advanced copy function can be applied to a variable allocation virtual volume such as a Thin Provisioning volume.

Japanese Laid-open Patent Publications No. 2008-130080, No. 2008-181271, No. 2003-256148, and No. 02-093721 are examples of related art.

Examples of the above-described advanced copy function include a remote advanced copy function of typically backing up the volume of a copy source storage unit to the volume of a copy destination storage unit disposed far from the copy source storage unit. In the remote advanced copy function, when copying processing for copying data from a copy source to a copy destination starts, initial copying processing for sequentially transferring pieces of data in the copy range of the copy source to the copy destination in predetermined units is performed.

However, in a variable allocation virtual volume such as a Thin Provisioning volume, zero data is allocated to an area having no real data as dummy information. This means that zero is read from the area when data is read from the area by a server. Accordingly, when the area having no real data is subjected to copying in the above-described remote advanced copy function, as illustrated in FIG. 1, the zero data that is dummy information is remotely transferred from the area. As a result, a large amount of data is transferred. In FIG. 1, "allocated" represents a state in which a physical area (storage area) has already been allocated to a target virtual area (virtual block) in a virtual volume, and "unallocated" represents a state in which a physical area (storage area) is not allocated to a target virtual area (virtual block) in a virtual volume. Such transferring of unnecessary data becomes a serious problem when a remote line is a line with a low bandwidth.

SUMMARY

According to an aspect of the invention, a storage apparatus for providing a first virtual volume including at least a first block, the storage apparatus being connectable to another storage apparatus so as to copy the data thereto, the another apparatus providing a second virtual volume including at least a second block corresponding to the first block, includes at least a storage unit having a plurality of storage areas, each of storage areas being allocatable as a one of the first blocks; a memory storing information for indicating a relationship between each of the first blocks and each of the storage areas, at least one of the storage areas being allocated to the at least one of the first blocks according to a usage pattern of the first virtual volume; and a controller configured to receive an instruction for copying data stored in the first virtual volume to the second virtual volume, determine whether each of the first blocks is allocated to any of the storage areas or not in reference to the information, transmit first data stored in the at least one of the first storage areas to the another apparatus if the first block is allocated to the one of the first storage areas, and transmit second data indicating that the other first blocks are not allocated to any of the first storage areas to the another apparatus if the first block is not allocated to any of the storage areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating data transfer patterns used in data transmission/receiving processing according to an embodiment;

FIG. 9 is a diagram illustrating a copy management table according to an embodiment;

FIG. 12 is a diagram illustrating a physical area conversion table according to an embodiment; and FIG. 13 is a diagram illustrating a compressed data table according to an embodiment.

DESCRIPTION OF EMBODIMENTS

Figure 1:
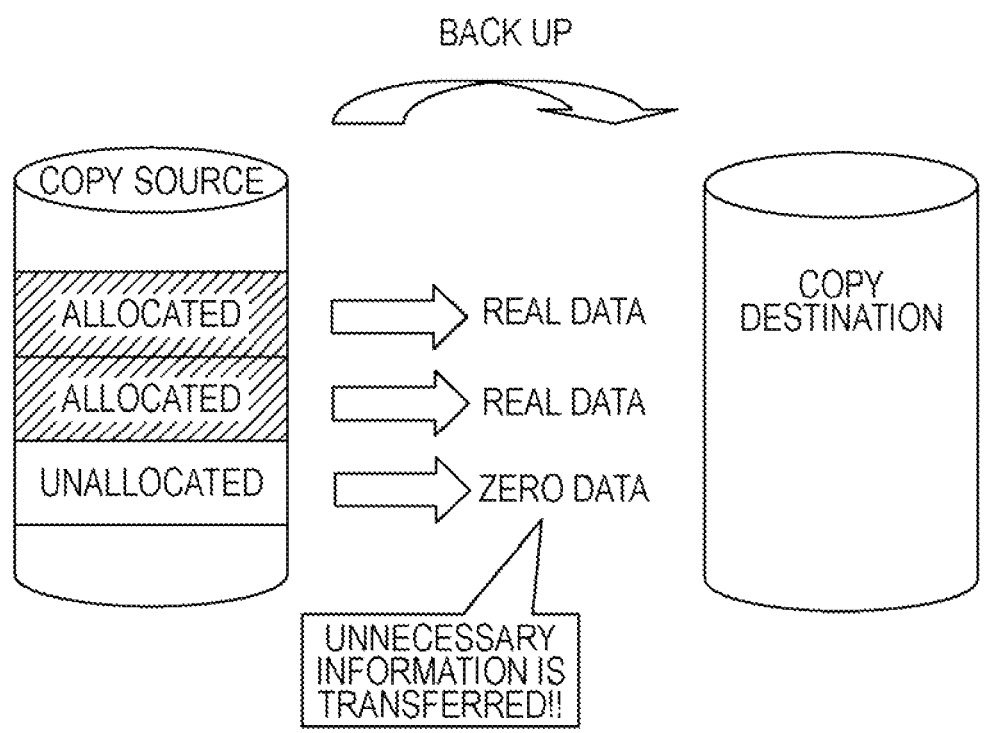
FIG. 1 is a diagram illustrating copying processing in the related art for copying data from a variable allocation virtual volume.
Figure 2:
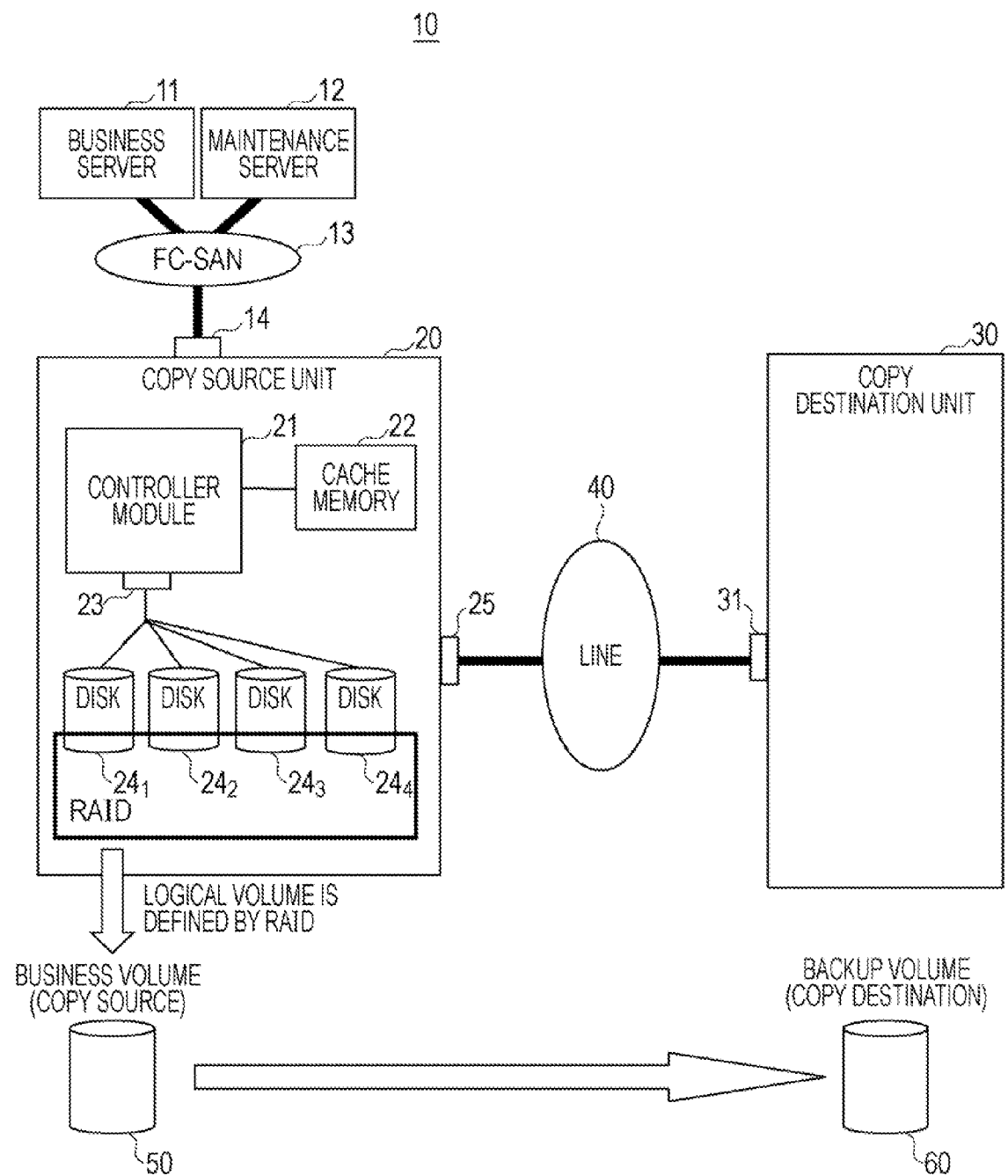
FIG. 2 is a diagram illustrating a configuration of a storage system according to an embodiment.

A storage system according to an embodiment will be described with reference to FIG. 2. FIG. 2 illustrates the configuration of a storage system according to an embodiment. In the following description, like reference numerals designate identical or corresponding components.

As illustrated in FIG. 2, a storage system 10 includes a business server 11, a maintenance server 12, a Fibre Channel-Storage Area Network (FC-SAN) 13, a copy source unit 20, a copy destination unit 30, and a line 40. The copy source unit 20 provides a business volume 50 that is a copy source virtual volume. The copy destination unit 30 provides a backup volume 60 that is a copy destination virtual volume.

The business server 11 accesses the business volume 50 of the copy source unit 20 via the FC-SAN 13 and performs various processing operations upon pieces of data stored in the business volume 50.

The maintenance server 12 copies the pieces of data stored in the business volume 50 to the backup volume 60 of the copy destination unit 30 using dedicated software. The copying processing can be performed with the above-described remote advanced copy function, etc. In the following, the remote advanced copy function will be described. However, the present invention is not limited to the remote advanced copy function, and any copy function with which data can be backed up from the business volume 50 to the backup volume 60 may be used. The maintenance server 12 may use ETERNUS SF AdvancedCopy Manager or ETERNUS VSS Hardware Provider sold by FUJITSU LIMITED as the dedicated software. In FIG. 2, the maintenance server 12 is disposed independently of the business server 11, but the business server 11 and the maintenance server 12 may be integrated.

The FC-SAN 13 is a storage area network achieved by Fibre Channel that is a high-speed serial interface, and connects the business server 11, the maintenance server 12, and the copy source unit 20 to one another. The business server 11, the maintenance server 12, and the copy source unit 20 may be connected to one another by another appropriate network or bus instead of the FC-SAN 13.

The copy source unit 20 stores pieces of data including business data upon which the business server 11 performs various processing operations, and provides the business volume 50. In an embodiment, the copy source unit 20 includes a controller module 21, a cache memory 22, FC ports 14, 23, and 25, and disks 241 to 244.

The controller module 21 is typically achieved by a processor, and controls various components included in the copy source unit 20 by executing programs stored in the cache memory 22. In another embodiment, the controller module 21 may be achieved by another piece of hardware such as a logic circuit for controlling various components included in the copy source unit 20.

The cache memory 22 is connected to the controller module 21, and stores a program for controlling the operation of the controller module 21. Furthermore, the cache memory 22 may be used as a work memory for temporarily storing data used for various processing operations performed by the controller module 21.

The FC ports 14, 23, and 25 function as interfaces for the FC-SAN 13, the disks 241 to 244, and the line 40, respectively. Instead of the FC ports 14, 23, and 25, other appropriate interfaces used for connections to the FC-SAN 13, the disks (storage units) 241 to 244, and the line 40 may be used.

The disks 241 to 244 are the same type of disks or different types of disks capable of storing data, and function as a storage apparatus for the copy source unit 20 with Redundant Arrays of Inexpensive Disks (RAID). In FIG. 2, four disks, the disks 241 to 244, are illustrated. However, any number of disks may be used.

The copy destination unit 30 is typically disposed far from the copy source unit 20, and is connected to the copy source unit 20 via the line 40. When the maintenance server 12 starts a remote advanced copy function, the copy destination unit 30 receives data stored in the business volume 50 from the copy source unit 20 via the line 40 and an FC port 31 and stores the received data. The copy destination unit 30 provides the backup volume 60 that is made equivalent to the business volume 50 by the remote advanced copy function. Like the copy source unit 20, the copy destination unit 30 includes the controller module 21, the cache memory 22, the FC ports 14, 23, and 25, and the disks 241 to 244. The description and illustration thereof will be omitted for simplification of explanation.

The line 40 may be any appropriate communication line capable of connecting the copy source unit 20 and the copy destination unit 30 to each other. It is desirable that the line 40 be a line with a high bandwidth. In this case, however, the cost of installation and maintenance of the line 40 is high.

The business volume 50 provided by the copy source unit 20 may be a variable allocation virtual volume such as a Thin Provisioning volume to which a physical area (storage area) is variably allocated in accordance with a usage pattern or may be a current (or normal) volume that is not a variable allocation virtual volume. The business volume 50 is a logic volume defined by RAID which is composed of the disks 241 to 244. Usually, the current volume has a storage capacity independent of actual amount of data stored in the current volume.

The backup volume 60 provided by the copy destination unit 30 may be a variable allocation virtual volume such as a Thin Provisioning volume or may be a current or normal volume that is not a variable allocation virtual volume. Like the business volume 50, the business volume 60 is a logic volume composed of the disks 241 to 244.

A remote advanced copy function that can be applied to a variable allocation virtual volume according to an embodiment will be described below.

When the maintenance server 12 starts a remote advanced copy function, initial copying processing for copying the entire data from the business volume 50 to the backup volume 60 is typically performed. After the initial copying processing has been completed, the equivalence between the business volume 50 and the backup volume 60 is maintained. A remote advanced copy function that can be applied to a variable allocation virtual volume according to an embodiment includes remote advanced copy start processing to be described later and data transmission/receiving processing to be described later.

Figure 3:
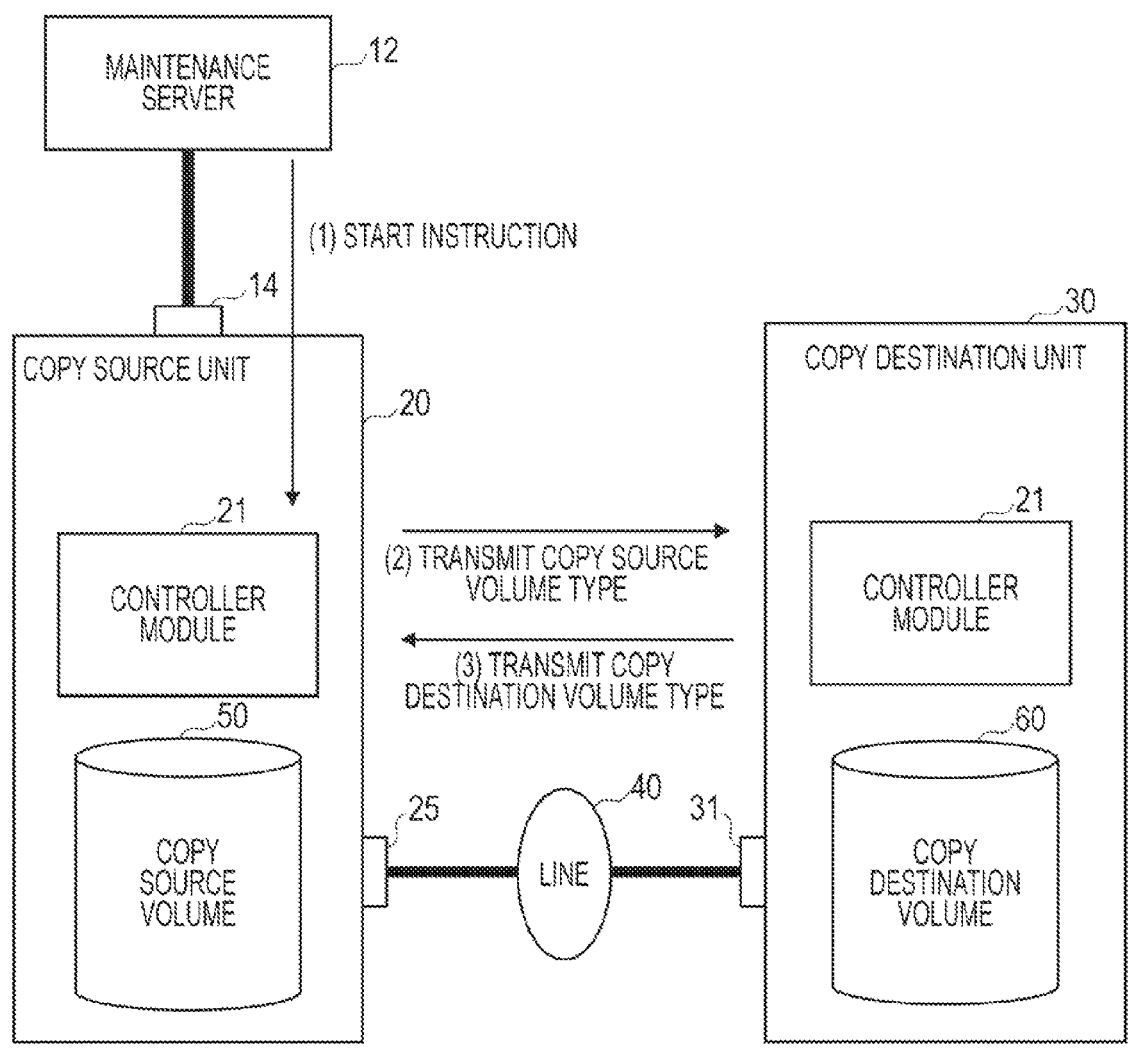
FIG. 3 is a diagram illustrating remote advanced copy start processing according to an embodiment.

The remote advanced copy start processing included in the remote advanced copy function that can be applied to a variable allocation virtual volume according to an embodiment will be described with reference to FIG. 3. FIG. 3 illustrates remote advanced copy start processing according to an embodiment.

In Thin Provisioning, it is impossible for a server to determine whether a copy source volume and a copy destination volume are Thin Provisioning virtual volumes or normal or current volumes that are not Thin Provisioning virtual volumes, that is, determine the volume types of a copy source and a copy destination. Accordingly, the copy source unit 20 that has received a remote advanced copy function start instruction from the maintenance server 12 cannot determine the volume type of the backup volume 60 of the copy destination unit 30 on the basis of information received from the maintenance server 12.

In remote advanced copy start processing according to an embodiment, as illustrated in FIG. 3, upon receiving a remote advanced copy function start instruction from the maintenance server 12, the controller module 21 included in the copy source unit 20 communicates with the controller module 21 included in the copy destination unit 30 before performing data transfer processing so as to transmit and receive a volume type to and from the copy destination unit 30. As a result, the controller module 21 included in the copy source unit 20 can specify and store the volume type of the copy destination unit 30, and the controller module 21 included in the copy destination unit 30 can specify and store the volume type of the copy source unit 20.

Next, the data transmission/receiving processing included in the remote advanced copy function that can be applied to a variable allocation virtual volume according to an embodiment will be described with reference to FIG. 4. FIG. 4 illustrates data transfer patterns used in data transmission/receiving processing according to an embodiment.

As described previously, in the remote advanced copy start processing, the controller module 21 included in the copy source unit 20 specifies and stores the volume type of the copy destination unit 30 before performing data transfer processing. When both of the business volume 50 of the copy source unit 20 and the backup volume 60 of the copy destination unit 30 are Thin Provisioning volumes and a physical area is not allocated to a transfer area in the business volume 50 of the copy source unit 20, the controller module 21 included in the copy source unit 20 compresses zero data by specifying the initial address and block length of an allocation area and transfers the compressed zero data to the copy destination unit 30. In other cases, the controller module 21 included in the copy source unit 20 transfers real data stored in the business volume 50 of the copy source unit 20 to the copy destination unit 30.

On the other hand, when the backup volume 60 of the copy destination unit 30 is a Thin Provisioning volume, the controller module 21 included in the copy destination unit 30 analyzes the data received from the copy source unit 20 so as to determine whether the received data is real data or compressed data.

When the received data is real data and a physical area has already been allocated to a copy destination area in the backup volume 60, the controller module 21 included in the copy destination unit 30 copies the received real data to the copy destination area. On the other hand, when the received data is real data and a physical area is not allocated to the copy destination area in the backup volume 60, the controller module 21 included in the copy destination unit 30 allocates a physical area to the copy destination area and then copies the received real data to the copy destination area.

When the received data is compressed data and a physical area has already been allocated to the copy destination area in the backup volume 60, the controller module 21 included in the copy destination unit 30 deallocates the physical area allocated to the copy destination area or copies zero data to the copy destination area. On the other hand, when the received data is compressed data and a physical area is not allocated to the copy destination area in the backup volume 60, the controller module 21 included in the copy destination unit 30 ends the data copying processing without processing the copy destination area.

Concrete processing performed on the basis of the combination of conditions of the business volume 50 of the copy source unit 20 and the backup volume 60 of the copy destination unit 30 will be described in detail with reference to the data transfer patterns according to an embodiment illustrated in FIG. 4.

Each of the illustrated data transfer patterns is formed on the basis of the combination of some conditions. One of these conditions is the types (a Thin Provisioning volume or a current volume that is not a Thin Provisioning volume) of the business volume 50 of the copy source unit 20 and the backup volume 60 of the copy destination unit 30. The other one of these conditions is the physical area allocation state of a copy target area of each of the volumes 50 and 60 when the business volume 50 of the copy source unit 20 and the backup volume 60 of the copy destination unit 30 are Thin Provisioning volumes. In the remote advanced copy function, copying processing is performed on the basis of these conditions.

In the illustrated data transfer patterns, in a first column, a case (i) in which the business volume 50 of the copy source unit 20 is a Thin Provisioning volume and a physical area is not allocated to the business volume 50, a case (ii) in which the business volume 50 of the copy source unit 20 is a Thin Provisioning volume and a physical area has already been allocated to the business volume 50, and a case (iii) in which the business volume 50 of the copy source unit 20 is a current volume are illustrated. In a second column, one of these cases (i) to (iii) regarding the business volume 50 of the copy source unit 20 is associated with one of a case (a) in which the backup volume 60 of the copy destination unit 30 is a Thin Provisioning volume and a physical area is not allocated to the backup volume 60, a case (b) in which the backup volume 60 of the copy destination unit 30 is a Thin Provisioning volume and a physical area has already been allocated to the backup volume 60, and a case (c) in which the backup volume 60 of the copy destination unit 30 is a current volume.

In the illustrated data transfer patterns, in a first row, the case (i) in which the business volume 50 of the copy source unit 20 is a Thin Provisioning volume and a physical area is not allocated to the business volume 50, is associated with the case (a) in which the backup volume 60 of the copy destination unit 30 is a Thin Provisioning volume and a physical area is not allocated to the backup volume 60.

In this case, as described previously, the controller module 21 included in the copy source unit 20 compresses zero data that is dummy information. That is, the controller module 21 generates data representing that the physical area is not allocated to the business volume 50. Then the controller module 21 transfers the compressed zero data representing that the physical area is not allocated to the business volume 50 to the copy destination unit 30. Upon receiving the compressed zero data, as described previously, the controller module 21 included in the copy destination unit 30 ends the data copying processing without processing a copy destination area in the backup volume 60 of the copy destination unit 30.

In the illustrated data transfer patterns, in a second row, the case (i) in which the business volume 50 of the copy source unit 20 is a Thin Provisioning volume and a physical area is not allocated to the business volume 50, is associated with the case (b) in which the backup volume 60 of the copy destination unit 30 is a Thin Provisioning volume and a physical area has already been allocated to the backup volume 60. In this case, as described previously, the controller module 21 included in the copy source unit 20 compresses zero data that is dummy information. That is, the controller module 21 generates data representing that the physical area is not allocated to the business volume 50. Then the controller module 21 transfers the compressed zero data representing that the physical area is not allocated to the business volume 50 to the copy destination unit 30. Upon receiving the compressed zero data, as described previously, the controller module 21 included in the copy destination unit 30 deallocates the physical area allocated to the copy destination area in the backup volume 60 of the copy destination unit 30. Alternatively, in this case, as described previously, the controller module 21 included in the copy destination unit 30 may copy zero data to the copy destination area in the backup volume 60 of the copy destination unit 30.

In the illustrated data transfer patterns, in a third row, the case (i) in which the business volume 50 of the copy source unit 20 is a Thin Provisioning volume and a physical area is not allocated to the business volume 50, is associated with the case (c) in which the backup volume 60 of the copy destination unit 30 is a current volume.

In this case, as described previously, the controller module 21 included in the copy source unit 20 compresses zero data that is dummy information. That is, the controller module 21 generates data representing that the physical area is not allocated to the business volume 50. Then the controller module 21 transfers the compressed zero data representing that the physical area is not allocated to the business volume 50 to the copy destination unit 30. Upon receiving the zero data, the controller module 21 included in the copy destination unit 30 writes zero data to a copy destination area in the backup volume 60 of the copy destination unit 30.

The controller module 21 included in the copy source unit 20 may transfer zero data that is dummy information to the copy destination unit 30. Upon receiving the zero data, the controller module 21 included in the copy destination unit 30 copies the zero data to a copy destination area in the backup volume 60 of the copy destination unit 30.

In the illustrated data transfer patterns, in a fourth row, the case (ii) in which the business volume 50 of the copy source unit 20 is a Thin Provisioning volume and a physical area has already been allocated to the business volume 50 is associated with the case (a) in which the backup volume 60 of the copy destination unit 30 is a Thin Provisioning volume and a physical area is not allocated to the backup volume 60. In this case, as described previously, the controller module 21 included in the copy source unit 20 transfers real data to the copy destination unit 30. Upon receiving the real data, the controller module 21 included in the copy destination unit 30 allocates a physical area to the copy destination area in the backup volume 60 of the copy destination unit 30 and copies the real data to the copy destination area.

In the illustrated data transfer patterns, in a fifth row, the case (ii) in which the business volume 50 of the copy source unit 20 is a Thin Provisioning volume and a physical area has already been allocated to the business volume 50 is associated with the case (b) in which the backup volume 60 of the copy destination unit 30 is a Thin Provisioning volume and a physical area has already been allocated to the backup volume 60.

In this case, the controller module 21 included in the copy source unit 20 transfers real data to the copy destination unit 30. Upon receiving the real data, the controller module 21 included in the copy destination unit 30 copies the real data to the copy destination area in the backup volume 60.

In the illustrated data transfer patterns, in a sixth row, the case (ii) in which the business volume 50 of the copy source unit 20 is a Thin Provisioning volume and a physical area has already been allocated to the business volume 50 is associated with the case (c) in which the backup volume 60 of the copy destination unit 30 is a current volume. In this case, the controller module 21 included in the copy source unit 20 transfers real data to the copy destination unit 30. Upon receiving the real data, the controller module 21 included in the copy destination unit 30 copies the real data to the copy destination area in the backup volume 60.

In the illustrated data transfer patterns, in a seventh row, the case (iii) in which the business volume 50 of the copy source unit 20 is a current volume is associated with the case (a) in which the backup volume 60 of the copy destination unit 30 is a Thin Provisioning volume and a physical area is not allocated to the backup volume 60. In this case, as described previously, the controller module 21 included in the copy source unit 20 transfers real data to the copy destination unit 30. Upon receiving the real data, the controller module 21 included in the copy destination unit 30 allocates a physical area to a copy destination area in the backup volume 60 of the copy destination unit 30 and copies the real data to the copy destination area in the backup volume 60.

In the illustrated data transfer patterns, in an eighth row, the case (iii) in which the business volume 50 of the copy source unit 20 is a current volume is associated with the case (b) in which the backup volume 60 of the copy destination unit 30 is a Thin Provisioning volume and a physical area has already been allocated to the backup volume 60. In this case, the controller module 21 included in the copy source unit 20 transfers real data to the copy destination unit 30. Upon receiving the real data, the controller module 21 included in the copy destination unit 30 copies the real data to the copy destination area in the backup volume 60.

In the illustrated data transfer patterns, in a ninth row, the case (iii) in which the business volume 50 of the copy source unit 20 is a current volume is associated with the case (c) in which the backup volume 60 of the copy destination unit 30 is a current volume. In this case, the controller module 21 included in the copy source unit 20 transfers real data to the copy destination unit 30. Upon receiving the real data, the controller module 21 included in the copy destination unit 30 copies the real data to the copy destination area in the backup volume 60.

Next, an initial copying operation performed immediately after a remote advanced copy function, which can be applied to a variable allocation virtual volume according to an embodiment, has started and an in-service copying operation performed when the business volume 50 is updated will be described with reference to FIGS. 5 to 7. In the drawings, the backup of the business volume 50 that is a Thin Provisioning volume of the copy source unit 20 is generated in the backup volume 60 that is a Thin Provisioning volume of the copy destination unit 30.

Figure 5:
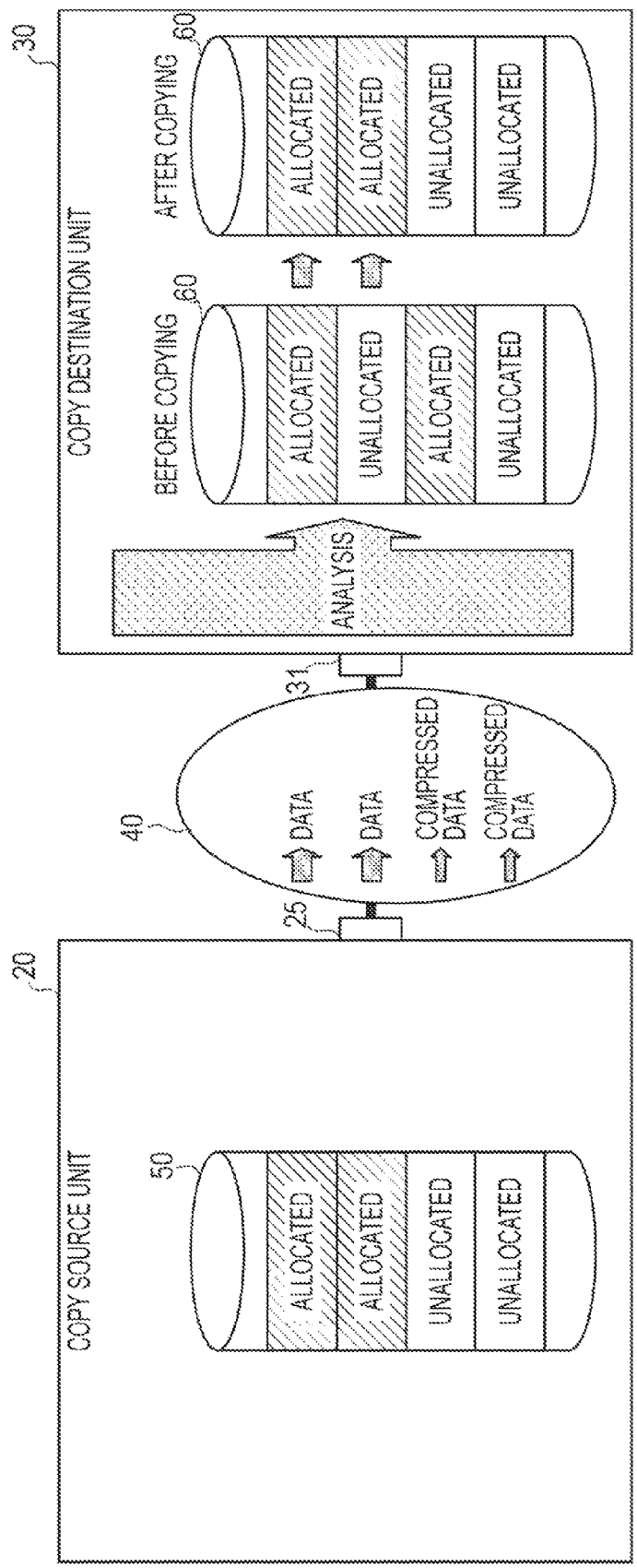
FIG. 5 is a schematic diagram illustrating an initial copying operation performed in remote advanced copy start processing according to an embodiment.

FIG. 5 is a schematic diagram illustrating an initial copying operation performed in remote advanced copy start processing according to an embodiment. When a remote advanced copy function that can be applied to a variable allocation virtual volume according to an embodiment is performed, as illustrated in FIG. 5, the controller module 21 included in the copy source unit 20 sequentially copies pieces of data stored in the business volume 50 of the copy source unit 20 starting from the head to the backup volume 60 of the copy destination unit 30. In FIG. 5, before the initial copying operation starts, the states of areas in the business volume 50 of the copy source unit 20 are "allocated", "allocated", "unallocated" and "unallocated" from the head and the states of areas in the backup volume 60 of the copy destination unit 30 are "allocated", "unallocated", "allocated", and "unallocated" from the head.

After the remote advanced copy function has started, the controller module 21 included in the copy source unit 20 communicates with the controller module 21 included in the copy destination unit 30 and determines that both of the volumes of the copy source unit 20 and the copy destination unit 30 are Thin Provisioning volumes. Subsequently, the controller module 21 included in the copy source unit 20 starts to sequentially copy pieces of data stored in the business volume 50 from the head so as to make the business volume 50 and the backup volume 60 equivalent to each other.

In FIG. 5, the controller module 21 included in the copy source unit 20 transfers these pieces of data in accordance with the above-described data transfer patterns. That is, in the case of data stored in an allocated area in the business volume 50, the controller module 21 included in the copy source unit 20 transfers real data stored in the allocated area to the copy destination unit 30 on the basis of the case (ii). In the case of data stored in an unallocated area in the business volume 50, the controller module 21 included in the copy source unit 20 compresses zero data and transfers the compressed zero data to the copy destination unit 30 on the basis of the case (i). The compression of zero data may be typically performed by specifying a start Logical Block Addressing (LBA) representing the initial address of a transfer area and a Block Count (BC) representing a block length measured from the initial address. Here, an LBA is an address representing each area in a volume.

The controller module 21 included in the copy destination unit 30 sequentially receives "data", "data", "compressed data", and "compressed data" that have been transferred thereto from the allocated area, the allocated area, the unallocated area, and the unallocated area, respectively, analyzes the received pieces of data, and copies the analyzed pieces of data to the backup volume 60 of the copy destination unit 30.

More specifically, upon receiving the "data" from the copy source unit 20, the controller module 21 included in the copy destination unit 30 copies the received data to a copy destination area for the received data in the backup volume 60 on the basis of the data transfer pattern in the fifth row when the state of the copy destination area is "allocated" (see, a first row in a volume having a title of "after copying" in the copy destination unit 30 illustrated in FIG. 5). On the other hand, the controller module 21 included in the copy destination unit 30 allocates a physical area to a copy destination area for the received data in the backup volume 60 and copies the received data to the copy destination area on the basis of the data transfer pattern in the fourth row when the state of the copy destination area is "unallocated" (see, a second row in the volume having the title of "after copying" in the copy destination unit 30 illustrated in FIG. 5).

Upon receiving the "compressed data" from the copy source unit 20, the controller module 21 included in the copy destination unit 30 deallocates a physical area allocated to a copy destination area for the received compressed data in the backup volume 60 (see, a third row in the volume having the title of "after copying" in the copy destination unit 30 illustrated in FIG. 5) or copies zero data to the copy destination area on the basis of the data transfer pattern in the second row when the state of the copy destination area is "allocated". On the other hand, the controller module 21 included in the copy destination unit 30 does not perform copying processing on the basis of the data transfer pattern in the first row when the state of a copy destination area for the received compressed data in the backup volume 60 is "unallocated" (see, a fourth row in the volume having the title of "after copying" in the copy destination unit 30 illustrated in FIG. 5).

Figure 6:
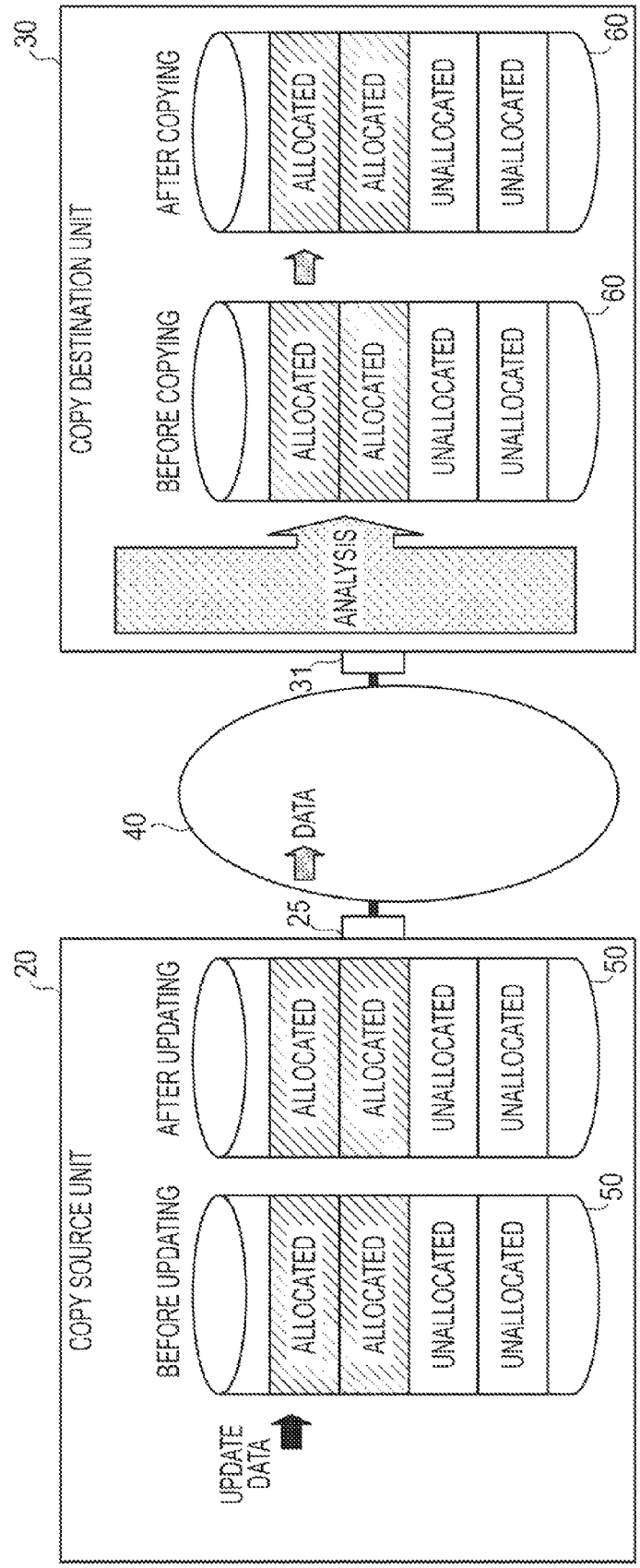
FIG. 6 is a schematic diagram illustrating an in-service copying operation performed in remote advanced copy start processing according to an embodiment.

FIG. 6 is a schematic diagram illustrating an in-service copying operation performed in remote advanced copy start processing according to an embodiment. When the initial copying operation illustrated in FIG. 5 is completed after a remote advanced copy function has started, the business volume 50 of the copy source unit 20 is equivalent to the backup volume 60 of the copy destination unit 30 (see, a volume having a title of "before updating" in the copy source unit 20 and a volume having a title of "before copying" in the copy destination unit 30 illustrated in FIG. 6). After that, when data stored in the business volume 50 of the copy source unit 20 is updated, the updated data is copied to the backup volume 60 of the copy destination unit 30. As a result, the updating in the business volume 50 is reflected in the backup volume 60.

In FIG. 6, update data is written into a copy source area in a first row in the business volume 50. The controller module 21 included in the copy source unit 20 transfers to the copy destination unit 30 updated data stored in the copy source area into which the update data has been written. Upon receiving the updated data, since the state of a copy destination area for the updated data is "allocated", the controller module 21 included in the copy destination unit 30 copies the received data to the copy destination area. Thus, it is possible to maintain the equivalence between the business volume 50 and the backup volume 60 during operation.

Figure 7:
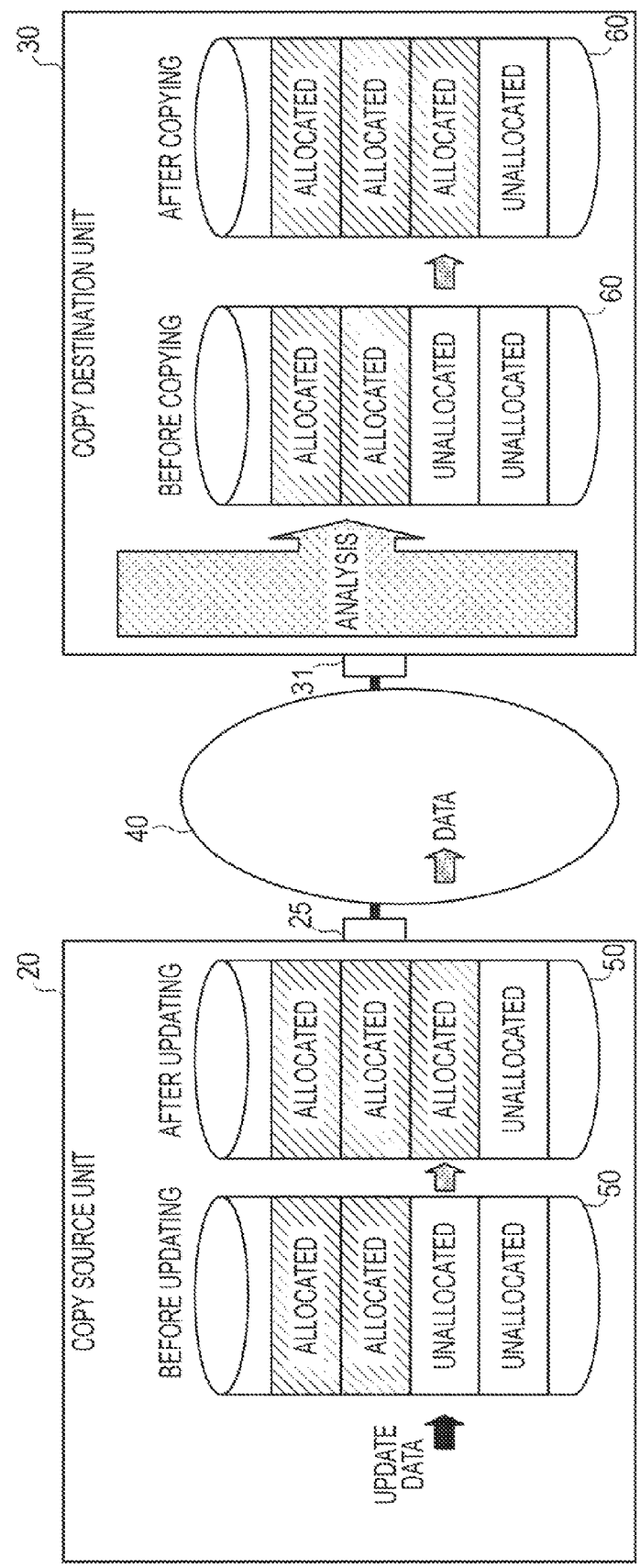
FIG. 7 is a schematic diagram illustrating an in-service copying operation performed in remote advanced copy start processing according to another embodiment.

FIG. 7 is a schematic diagram illustrating an in-service copying operation performed in remote advanced copy start processing according to another embodiment. In FIG. 7, update data is written into a copy source area in a third row in the business volume 50. Since the state of this copy source area is "unallocated", the controller module 21 included in the copy source unit 20 allocates a physical area to the copy source area and writes the update data into the copy source area. In addition, the controller module 21 included in the copy source unit 20 transfers to the copy destination unit 30 updated data stored in the copy source area into which the update data has been written. Upon receiving the updated data, since the state of a copy destination area for the updated data is "unallocated", the controller module 21 included in the copy destination unit 30 allocates a physical area to the copy destination area and copies the received data to the copy destination area. Thus, it is possible to maintain the equivalence between the business volume 50 and the backup volume 60 during operation.

Figure 8:
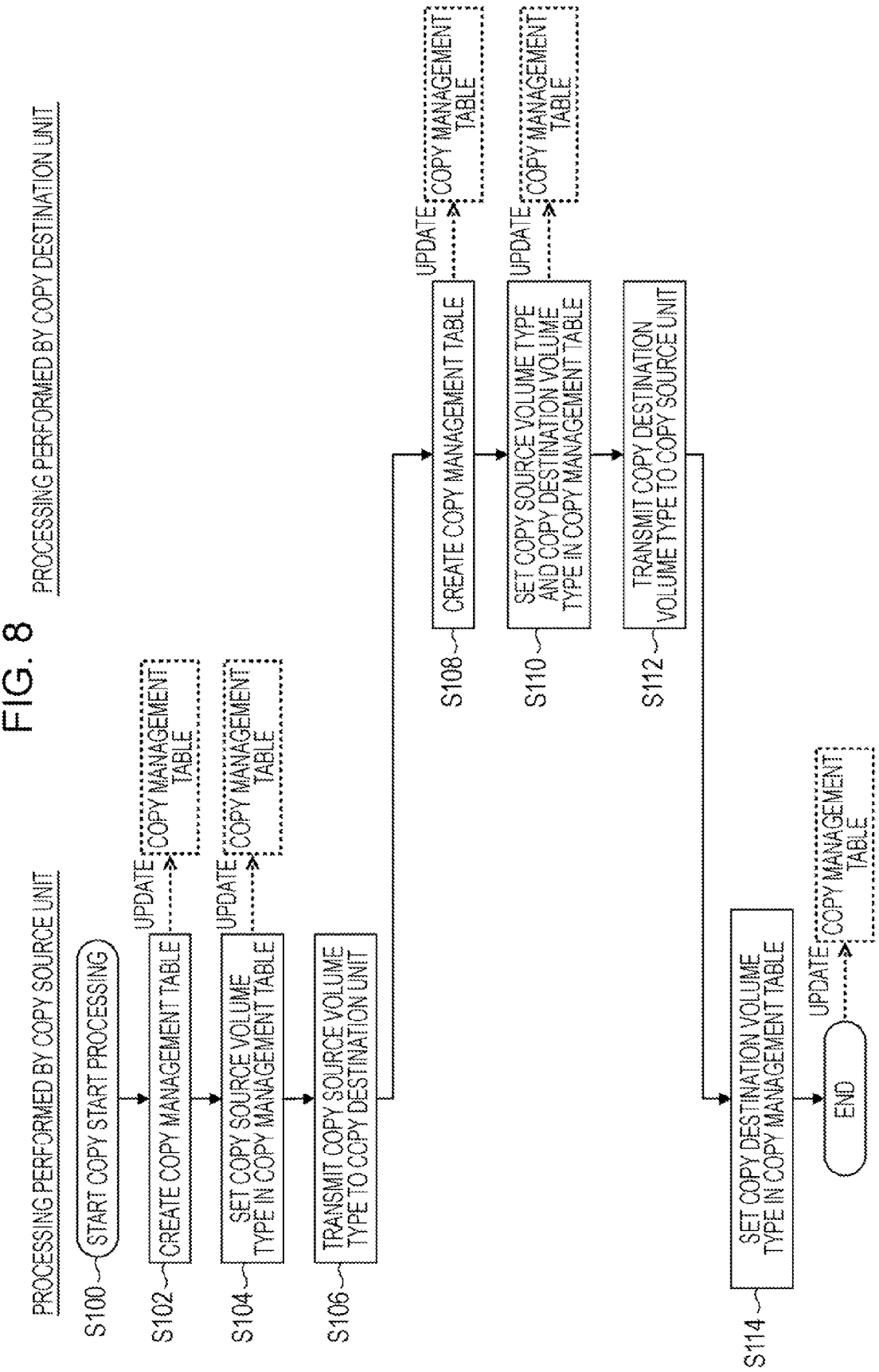
FIG. 8 is a flowchart illustrating a remote advanced copy start processing according to an embodiment.

Next, the flow of remote advanced copy start processing included in a remote advanced copy function that can be applied to a variable allocation virtual volume according to an embodiment will be described with reference to FIG. 8. FIG. 8 is a flowchart illustrating the flow of remote advanced copy start processing according to an embodiment.

In step S100, upon receiving an instruction for starting a remote advanced copy function from the maintenance server 12, the copy source unit 20 starts remote advanced copy start processing.

In step S102, the controller module 21 included in the copy source unit 20 creates a copy management table in the cache memory 22 so as to record volume type information representing the volume type of the business volume 50 of the copy source unit 20 and the volume type of the backup volume 60 of the copy destination unit 30.

In step S104, the controller module 21 included in the copy source unit 20 sets the volume type of the business volume 50 of the copy source unit 20 in the created copy management table.

In step S106, the controller module 21 included in the copy source unit 20 notifies the copy destination unit 30 of the volume type of the business volume 50.

In step S108, when the controller module 21 included in the copy destination unit 30 is notified of the volume type of the business volume 50 by the copy source unit 20, it creates a copy management table in the cache memory 22 so as to record volume type information representing the volume type of the business volume 50 of the copy source unit 20 and the volume type of the backup volume 60 of the copy destination unit 30.

In step S110, the controller module 21 included in the copy destination unit 30 sets in the created copy management table the volume type of the backup volume 60 of the copy destination unit 30 and the volume type of the business volume 50 that has been notified by the copy source unit 20.

In step S112, the controller module 21 included in the copy destination unit 30 notifies the copy source unit 20 of the volume type of the backup volume 60.

In step S114, when the controller module 21 included in the copy source unit 20 is notified of the volume type of the backup volume 60 by the copy destination unit 30, it sets the volume type of the backup volume 60 in the copy management table updated in step S104 and the remote advanced copy start processing ends. The copy management table may be updated as appropriate in the following processing.

A copy management table including the above-described volume type information will be described with reference to FIG. 9. FIG. 9 illustrates a copy management table according to an embodiment.

In an embodiment, a single copy management table is created and managed for a single copy session in each unit. As described previously, a copy management table used in the remote advanced copy start processing includes at least volume type information representing the volume type of the business volume 50 of the copy source unit 20 and the volume type of the backup volume 60 of the copy destination unit 30. As illustrated in FIG. 9, a copy management table may include other items regarding copying processing in addition to the volume type of the business volume 50 of the copy source unit 20 and the volume type of the backup volume 60 of the copy destination unit 30.

Figure 10:
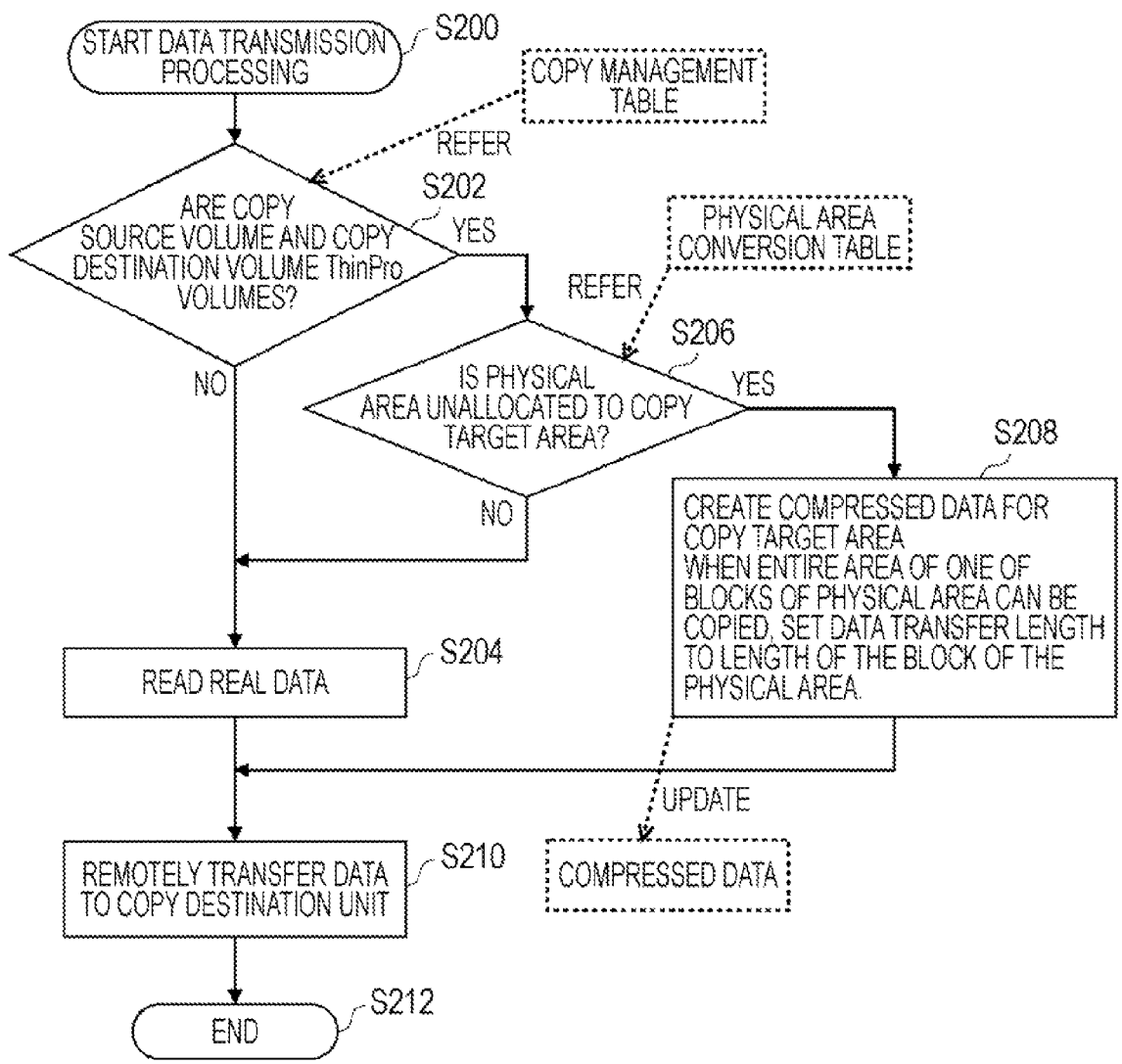
FIG. 10 is a flowchart illustrating data transmission processing according to an embodiment performed by a copy source unit.
Figure 11:
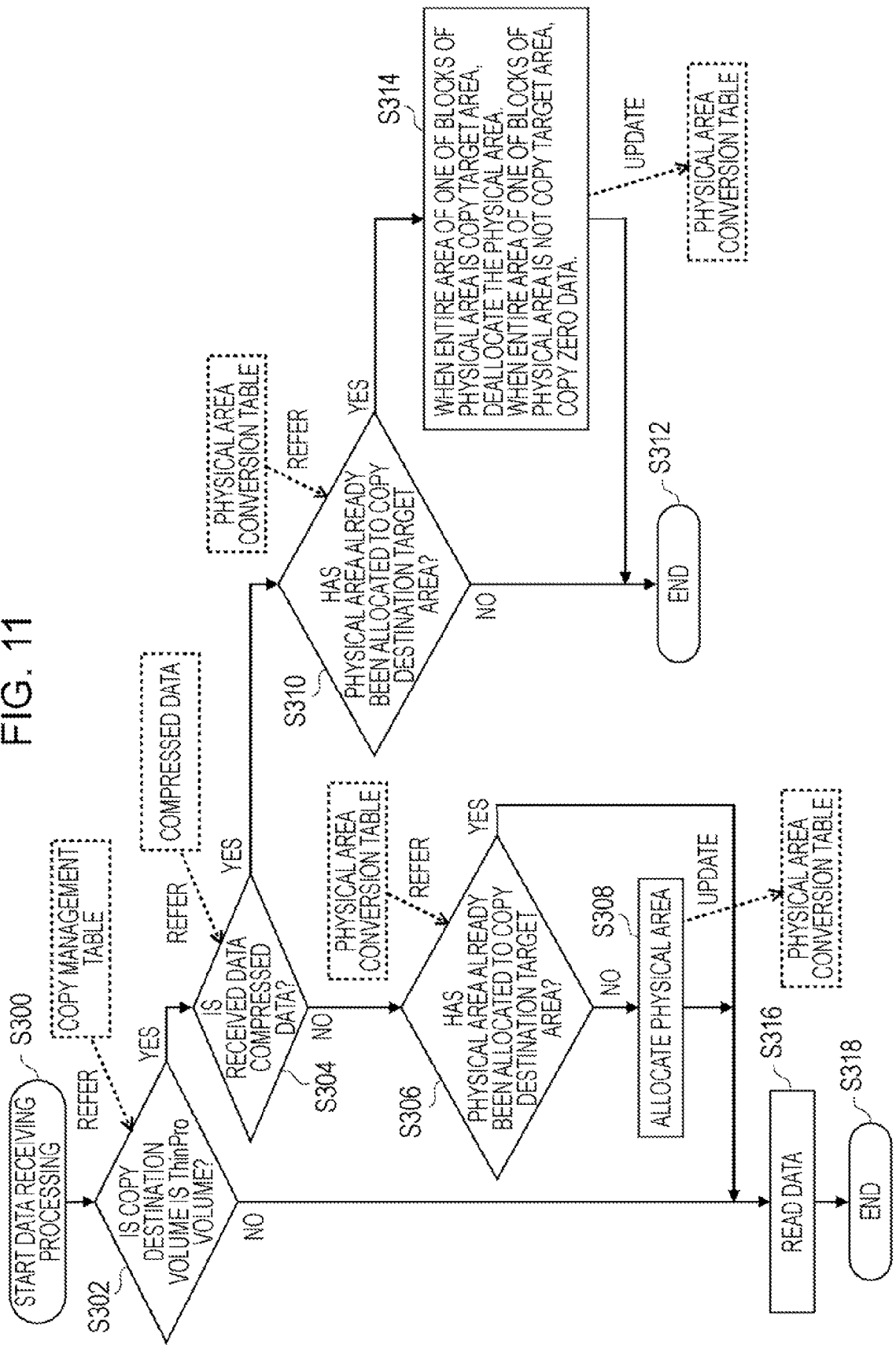
FIG. 11 is a flowchart illustrating data receiving processing according to an embodiment performed by a copy destination unit.

The flow of data transmission/receiving processing included in a remote advanced copy function that can be applied to a variable allocation virtual volume according to an embodiment will be described with reference to FIGS. 10 and 11. FIG. 10 is a flowchart illustrating the flow of data transmission processing performed by a copy source unit according to an embodiment. FIG. 11 is a flowchart illustrating the flow of data receiving processing performed by a copy destination unit according to an embodiment.

First, the flow of the data transmission processing performed by the copy source unit 20 will be described with reference to FIG. 10.

In step S200, when the controller module 21 included in the copy source unit 20 acquires the volume type of the business volume 50 of the copy source unit 20 and the volume type of the backup volume 60 of the copy destination unit 30 in the above-described remote advanced copy start processing, the data transmission processing starts.

In step S202, the controller module 21 refers to the copy management table stored in the cache memory 22 and determines whether the business volume 50 of the copy source unit 20 and the backup volume 60 of the copy destination unit 30 are Thin Provisioning volumes. More specifically, the controller module 21 specifies the volume types of the business volume 50 and the backup volume 60 set in the copy management table and determines whether both of the business volume 50 and the backup volume 60 are Thin Provisioning volumes.

When it is determined that at least one of the business volume 50 and the backup volume 60 is not a Thin Provisioning volume and is a current or normal volume (No in step S202), the process proceeds to step S204. On the other hand, when it is determined that both of the business volume 50 and the backup volume 60 are Thin Provisioning volumes (Yes in step S202), the process proceeds to step S206.

In step S204, the controller module 21 reads real data from a copy target area in the business volume 50.

In step S206, the controller module 21 determines whether a physical area is not allocated to the copy target area in the business volume 50. In an embodiment, the controller module 21 performs the above-described determination processing by referring to a physical area conversion table recording information about the relationship between each virtual area in the business volume 50 that is a virtual volume and a physical area in a physical volume which is allocated to the virtual area.

In an embodiment, a physical area conversion table may include data items illustrated in FIG. 12. In FIG. 12, LUN_V represents a virtual area (virtual block) in a virtual volume or a physical area (storage area) in a physical volume, and LBA (Logical Block Addressing) represents the address of each area. A physical volume is divided into blocks having a predetermined size. When writing of data into a virtual volume is performed, a physical area is allocated to the virtual volume in units of the blocks of the physical volume in accordance with the size of the data. In FIG. 12, it is assumed that each of the blocks of the physical volume has a size of 32 MB (0x10000 block count).

That is, the controller module 21 retrieves a physical area associated with a copy target area using the physical area conversion table. When a physical area associated with the copy target area is detected, the controller module 21 determines that a physical area has already been allocated to the copy target area. On the other hand, when a physical area associated with the copy target area is not detected using the physical area conversion table, the controller module 21 determines that a physical area is not allocated to the copy target area.

When it is determined that a physical area has already been allocated to the copy target area (No in step S206), the process proceeds to step S204 in which the controller module 21 reads real data from the copy target area. On the other hand, when it is determined that a physical area is not allocated to the copy target area (Yes in step S206), the process proceeds to step S208.

In step S208, the controller module 21 generates compressed data for the copy target area. As described previously, the compressed data is data transferred from the copy source unit 20 to the copy destination unit 30 when both of the business volume 50 of the copy source unit 20 and the backup volume 60 of the copy destination unit 30 are Thin Provisioning volumes and a physical area is not allocated to the copy target area in the business volume 50. More specifically, the compressed data may be compressed zero data generated by specifying a start LBA representing an initial address of a transfer area and a Block Count (BC) representing a block length measured from the initial address.

When each copy target area has a predetermined block length, the compressed data may be number or value representing the each copy target area unallocated to any of the physical areas. For example, the size of the each copy target area is the same as the each of the blocks of the physical volume having the size of 32 MB.

When the whole virtual areas in the business volume 50 are unallocated to any of the physical area, the compressed data may be number or value representing the business volume 50. The compressed data regarding the whole virtual areas is transferred to the backup volume 60 at one time.

As illustrated in FIG. 13, compressed zero data generated by specifying a start LBA and a transfer length may be transferred to each copy destination area (LUN_V) in the backup volume 60 of the copy destination unit 30. When the entire area of one of blocks of a physical area is a copy target area, a data transfer length is set to a length corresponding to the block of the physical area.

In step S210, the controller module 21 remotely transfers the real data read in step S204 or the compressed data generated in step S208 to the copy destination unit 30.

After the controller module 21 has transmitted all of pieces of transmission target data, the data transmission processing ends in step S212.

The flow of data receiving processing performed by the copy destination unit 30 will be described with reference to FIG. 11.

In step S300, upon receiving data from the copy source unit 20, the controller module 21 included in the copy destination unit 30 starts the data receiving processing.

In step S302, the controller module 21 refers to the copy management table stored in the cache memory 22 and determines whether the backup volume 60 of the copy destination unit 30 is a Thin Provisioning volume. More specifically, as described previously, the controller module 21 performs the above-described determination processing by detecting the volume type of the backup volume 60 set in the copy management table.

When it is determined that the backup volume 60 is not a Thin Provisioning volume and is a normal or current volume (No in step S302), the process proceeds to step S316. On the other hand, when it is determined that the backup volume 60 is a Thin Provisioning volume (Yes in step S302), the process proceeds to step S304.

In step S304, the controller module 21 determines whether the received data is compressed data. When it is determined that the received data is not compressed data and is real data (No in step S304), the process proceeds to step S306. On the other hand, when it is determined that the received data is compressed data (Yes in step S304), the process proceeds to step S310.

In step S306, the controller module 21 refers to a physical area conversion table and determines whether a physical area has already been allocated to a copy destination area in the backup volume 60. When it is determined that a physical area is not allocated to the copy destination area (No in step S306), the process proceeds to step S308 in which the controller module 21 allocates a physical area to the copy destination area. On the other hand, when it is determined that a physical area has already been allocated to the copy destination area (Yes in step S306), the process proceeds to step S316.

In step S316, the controller module 21 writes the received data into the copy destination area.

After the controller module 21 has performed the above-described processing upon all of pieces of received data, the data receiving processing ends in step S318.

On the other hand, when it is determined in step S304 that the received data is compressed data, the controller module 21 refers to the physical area conversion table and determines whether a physical area has already been allocated to the copy destination area in the backup volume 60 in step S310. When it is determined that a physical area is not allocated to the copy destination area (No in step S310), the process proceeds to step S312 in which the controller module 21 does not copy the received data and the data receiving processing ends. On the other hand, when it is determined that a physical area has already been allocated to the copy destination area (Yes in step S310), the process proceeds to step S314.

In step S314, the controller module 21 deallocates the physical area allocated to the copy destination area or copies zero data to the copy destination area. In an embodiment, when the entire area of one of blocks of the physical area is a copy target area, the controller module 21 may deallocate the physical area. When the entire area of one of blocks of the physical area is not a copy target area, the controller module 21 may copy zero data.

After the controller module 21 has performed the above-described processing upon all of pieces of received data, the data receiving processing ends in step S312.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

Using a disclosed configuration, it is possible to prevent the transferring of a large amount of data and effectively perform data transferring when data is remotely copied from a variable allocation virtual volume.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage apparatus for providing a first virtual volume including a plurality of first blocks, the storage apparatus in communication with another storage apparatus so as to copy the data thereto, the another apparatus providing a second virtual volume including at least a second block corresponding to the one of the plurality of first blocks, the storage apparatus comprising:

a storage unit having a plurality of storage areas, each of storage areas being allocatable as one of the plurality of first blocks;

a memory storing information indicating a relationship between each of the first blocks and each of the storage areas, at least one of the storage areas being allocated to the one of the plurality of first blocks according to a usage pattern of the first virtual volume; and a controller configured to
receive an instruction for copying data stored in the first virtual volume to the second virtual volume, determine whether each of the first blocks is allocated to any of the storage areas in reference to the information, transmit first data stored in the at least one of the first storage areas to the another apparatus if the first block is allocated to the one of the first storage areas, and transmit second data indicating that other ones of the plurality of first blocks are not allocated to any of the first storage areas to the another apparatus if the one of the plurality of first blocks is not allocated to any of the storage areas.

2. The storage apparatus according to claim 1, wherein the second data includes a number representing the one of the plurality of first blocks unallocated to any of the storage areas.

3. A storage apparatus for providing a first virtual volume including a plurality of first blocks, the storage apparatus in communication with another storage apparatus so as to copy the data thereto, the another apparatus providing a second virtual volume including at least a second block corresponding to the one of the plurality of first blocks, the storage apparatus comprising:

a storage unit having a plurality of storage areas, each of storage areas being allocatable as one of the plurality of first blocks;

a memory storing information indicating a relationship between each of the first blocks and each of the storage areas, at least one of the storage areas being allocated to the one of the plurality of first blocks according to a usage pattern of the first virtual volume; and a controller configured to receive an instruction for copying data stored in the first virtual volume to the second virtual volume, determine whether each of the first blocks is allocated to any of the storage areas in reference to the information, transmit first data stored in the at least one of the first storage areas to the another apparatus if the one of the plurality of first blocks is allocated to the one of the first storage areas, and transmit second data including an address representing an initial address of the one of the plurality of first blocks and a length representing a block length measured from the initial address to the another apparatus if the one of the plurality of first blocks is not allocated to any of the storage areas.

4. A storage apparatus for providing a first virtual volume including a plurality of first blocks, the storage apparatus in communication with another storage apparatus so as to receive the data therefrom, the another storage apparatus providing a second virtual volume including a second block corresponding to the one of the plurality of first blocks, the storage apparatus comprising:

a storage unit having a plurality of storage areas, each of storage areas being allocatable as one of the plurality of first blocks;

a memory storing information indicating a relationship between each of the first blocks and each of the storage areas, at least one of the storage areas being allocated to the one of the plurality of first blocks according to a usage pattern of the first virtual volume; and a controller configured to receive the data from the another storage apparatus, determine whether the received data is first data stored in the at least one of the second storage areas allocated to the second block or second data corresponding the other second blocks, and whether the first blocks are allocated to the first storage areas for copying the received data thereto or not in reference to the information, wherein in accordance with a combination of the determination alternatively, the controller allocates the first storage area to the first virtual volume and copies the received data to the first virtual volume, copies the received data to the first virtual volume, or deallocates the first storage area allocated to the first virtual volume.

5. The storage apparatus according to claim 4, wherein the second data includes an address representing an initial address of the second block and a length representing a block length measured from the initial address.

6. The storage apparatus according to claim 4, wherein when the received data is the first data and at least one of the first storage areas is allocated to at least one of the first blocks for copying the received data thereto, the controller copies the received data to the at least one of the first blocks for copying the received data thereto.

7. The storage apparatus according to claim 4, wherein when the received data is first data and the first storage areas are not allocated to any of the first blocks for copying the received data thereto, the controller allocates at least one of the first storage areas to at least one of the first blocks and copies the received data to the at least one of the first blocks.

8. The storage apparatus according to claim 4, wherein when the received data is the second data and the first storage area is allocated to at least one of the first blocks for copying the received data thereto, the controller deallocates the first storage area allocated to the at least one of the first blocks.

9. The storage apparatus according to claim 4, wherein when the received data is the second data and the first storage areas are not allocated to any of the first blocks for copying the received data thereto, the controller leaves the one of the plurality of first blocks.

10. The storage apparatus according to claim 4, wherein after initial copying process for copying all data of the second blocks to the first virtual volume, when the controller receives data stored in the second volume and at least one of the first storage areas is allocated to at least one of the first blocks for copying the received data thereto, the controller copies the received data to the at least one of the first blocks.

11. The storage apparatus according to claim 4, wherein after initial copying process for copying all data of the second block to the first virtual volume, when the controller receives data stored in the second volume and the first storage areas are not allocated to any of the first blocks for copying the received data thereto, the controller allocates at least one of the storage areas to the first blocks for copying the received data and copies the received data to the one of the plurality of first blocks.

12. A storage apparatus for providing a source volume having a volume type selected from a first virtual volume including a plurality of first blocks and a first normal volume, the storage apparatus in communication with another storage apparatus so as to copy the data thereto, the another storage apparatus providing a destination volume having a volume type selected from a second virtual volume including a plurality of second blocks and a second normal volume, the storage apparatus comprising:

a storage unit having a plurality of storage areas for providing the source volume;

a memory storing first information for representing the volume types of the source volume and the destination volume respectively and second information for indicating a relationship between each of the first blocks and each of the storage areas, at least one of the storage areas being allocated to at least one of the first blocks according to a usage pattern of the first virtual volume; and a controller configured to receive an instruction for copying data stored in the source volume to the destination volume, determine whether the volume type of the source volume is the first virtual volume or the first normal volume in reference to the first information, and whether the volume type of the destination volume is the second virtual volume or the second normal volume in reference to the first information, transmit data stored in the first blocks to the another storage apparatus if the volume type of the source volume is the normal volume, determine whether each of the first blocks is allocated to any of the first storage areas in reference to the second information if the type of the source volume is the first virtual volume, transmit first data stored in at least one of the first storage areas to the another storage apparatus if the at least one of the first blocks is allocated to the one of the first storage areas, and transmit second data indicating that other first blocks are not allocated to any of the first storage areas to the another storage apparatus if the at least one of the first blocks is not allocated to any of the storage areas.

13. The storage apparatus according to claim 12, wherein before transmitting the first data or the second data, the controller communicates with the another storage apparatus so as to receive a volume type of the destination volume of the another storage apparatus, generates volume type information of the source volume and the destination volume, and determines whether the source volume is the first virtual volume or the normal volume and the destination volume is the second virtual volume or the normal volume in reference to the volume type information.

14. A storage apparatus for providing a destination volume having a volume type selected from a first virtual volume including a plurality of first blocks and a first normal volume, the storage apparatus in communication with another storage apparatus so as to copy the data therefrom, the another storage apparatus providing a source volume having a volume type selected from a second virtual volume including a plurality of second blocks and a second normal volume, the storage apparatus comprising:

a storage unit including a plurality of storage areas for providing the destination volume;

a memory storing first information representing the volume types of the destination volume and the source volume respectively and second information for indicating a relationship between each of the first blocks and each of the storage areas, at least one of the storage areas being allocated to at least one of the first blocks according to a usage pattern of the first virtual volume; and a controller configured to determine whether the volume type of the destination volume is the first virtual volume or a first normal volume in reference to the first information, and whether the volume type of the source volume is a second virtual volume or a second normal volume in reference to the first information, receive the data from the another storage apparatus, determine whether the received data is first data stored in at least one of the second storage areas allocated to at least one of the second blocks or second data corresponding other second blocks, and whether the first storage areas are allocated to the first blocks for copying the received data thereto, if the type of the destination volume is the first virtual volume and the type of the source volume is the second virtual volume, wherein in accordance with a combination of the determination alternatively, the controller allocates the first storage area to the first virtual volume and copies the received data to the first virtual volume, copies the received data to the first virtual volume, or deallocates the first storage area allocated to the first virtual volume.

15. The storage apparatus according to claim 14, wherein before receiving data from the another storage apparatus the controller communicates with the another storage apparatus so as to receive volume type of the source volume of the another storage apparatus, generates volume type information of the destination volume and the source volume, and determines whether the destination volume is the first virtual volume or the normal volume and whether the source volume is the second virtual volume or the normal volume in reference to the volume type information.

16. A method of copying data stored in a first virtual volume of a first storage apparatus to a second virtual volume of a second storage apparatus, the first and the second virtual volumes including a plurality of first and second blocks respectively, the storage apparatus having a plurality of first storage areas for providing at least a part of the first virtual volume, the first storage areas being allocated to the first blocks according to a usage pattern of the first virtual volume, a plurality of the second storage areas being allocated to the second blocks according to a usage pattern of the second virtual volume, the method comprising:

storing information for indicating a relationship between each of the first blocks and each of the first storage areas;

receiving an instruction for copying data stored in the first virtual volume to the second virtual volume;

determining whether each of the first blocks is allocated to any of the first storage areas in reference to the information;

transmitting first data stored in at least one of the first storage areas to the second apparatus if one of the first blocks is allocated to the one of the first storage areas;

transmitting second data indicating that other first blocks are not allocated to any of the first storage areas to the second apparatus if the one of the first blocks is not allocated to any of the first storage areas;

storing information for indicating a relationship between each of the second blocks and each of the second storage areas;

receiving the transmitted data from the first storage apparatus;

determining whether the received data is first data stored in at least one of the second storage areas allocated to at least one of the first blocks or second data corresponding the other first blocks;

determining whether the second storage areas is allocated to the second blocks for copying the received data thereto; and in accordance with a combination of the determinations alternatively, allocating the second storage area to the second virtual volume and copying the received data to the second virtual volume, copying the received data to the second virtual volume, or deallocating the second storage area allocated to the second virtual volume.

* * * * *